United States Patent [19]

Woodruff et al.

[11] Patent Number: 4,522,835
[45] Date of Patent: Jun. 11, 1985

[54] PROCESS AND COMPOSITION FOR PRODUCING AND MAINTAINING GOOD COLOR IN FRESH MEAT, FRESH POULTRY AND FRESH FISH

[75] Inventors: Richard E. Woodruff, Salinas; John H. Silliker, Rolling Hills, both of Calif.

[73] Assignee: TransFRESH Corporation, Salinas, Calif.

[21] Appl. No.: 605,784

[22] Filed: May 1, 1984

Related U.S. Application Data

[63] Continuation of Ser. No. 24,730, Mar. 28, 1979, abandoned, which is a continuation of Ser. No. 817,184, Jul. 20, 1977, abandoned, which is a continuation-in-part of Ser. No. 722,870, Sep. 13, 1976, abandoned.

[51] Int. Cl.$^3$ ............................................. A23L 1/272
[52] U.S. Cl. ..................................... 426/264; 426/315; 426/332; 426/418
[58] Field of Search ............... 426/264, 315, 332, 418, 426/129, 312

[56] References Cited

U.S. PATENT DOCUMENTS

| | | | |
|---|---|---|---|
| 2,623,826 | 12/1952 | Grinstead | 426/129 |
| 2,676,943 | 4/1954 | Carson | 426/129 |
| 2,930,704 | 3/1960 | Williams | 426/315 |
| 3,122,748 | 2/1964 | Beebe | 426/129 |
| 3,459,117 | 8/1969 | Koch et al. | 99/467 |
| 3,574,642 | 4/1971 | Weinke | 426/129 |
| 3,930,040 | 12/1975 | Woodruff | 426/312 |

FOREIGN PATENT DOCUMENTS 1935566  1/1970  Fed. Rep. of Germany ...... 426/263

OTHER PUBLICATIONS

Food Technology, May 1964, pp. 159–163.

*Primary Examiner*—William Smith
*Attorney, Agent, or Firm*—Kendrick, Netter & Bennett

[57] ABSTRACT

Good color in fresh meat, fresh poultry, and fresh fish is established and maintained by subjecting such meat, poultry and fish to an atmosphere containing a low oxygen concentration to convert oxymyoglobin on the surface of the meat and poultry to reduced myoglobin, and both oxymyoglobin and oxyhemoglobin in fish to reduced myoglobin/hemoglobin, respectively, then subjecting the fresh meat, fresh poultry and fresh fish to a modified atmosphere containing a small amount of carbon monoxide to convert the reduced myoglobin to carboxymyoglobin to a depth of not more than about 0.375 inch below the surface of the meat and poultry, and to convert the reduced myoglobin/hemoglobin to reduced carboxymyoglobin/carboxyhemoglobin in the fish. The modified atmosphere is a new composition of matter.

During or after the conversion, the fresh meat, fresh poultry and fresh fish may be maintained at temperatures above freezing in an atmosphere that contains more than about 10% carbon dioxide by volume to inhibit bacterial growth, or, alternatively, the fresh meat, fresh poultry and fresh fish may be frozen and maintained frozen in normal air atmosphere.

26 Claims, No Drawings

PROCESS AND COMPOSITION FOR PRODUCING AND MAINTAINING GOOD COLOR IN FRESH MEAT, FRESH POULTRY AND FRESH FISH

This is a continuation of application Ser. No. 06/024,730, filed on Mar. 28, 1979, abandoned which is a continuation of U.S. patent application Ser. No. 817,184, filed on July 20, 1977, abandoned which is a continuation-in-part of U.S. patent application Ser. No. 722,870, filed on Sept. 13, 1976 abandoned.

This invention relates to a process and a composition for establishing and maintaining good color in fresh meat, fresh poultry and fresh fish.

The literature relating to the establishment and maintenance of good color in fresh meat, fresh poultry and fresh fish includes U.S. Pat. Nos. 3,851,808 and 3,930,040, and A. El Badawi, R. Cain, S. Samuels, and A. Anglemeier, *Color and Pigment Stability of Packaged Refrigerated Beef,* Food Technology, pp. 159–163 (May, 1964) and T. Besser and A. Kramer, *Changes in Quality and Nutritional Composition of Foods Preserved by Gas Exchange,* 37 Journal of Food Science, pp. 820–823 (1972) and which describe the use of certain modified gaseous atmospheres for providing and maintaining good color in fresh meat, fresh poultry and fresh fish. None, however, discloses the modified atmospheres of this invention or the highly simplified process of this invention for doing these tasks.

In accordance with this invention, good color is established and maintained in fresh meat, fresh poultry and fresh fish. In fresh meat and poultry, the process comprises subjecting meat, poultry, or both to an atmosphere sufficiently low in oxygen concentration to change a substantial portion of the oxymyoglobin on and below the meat or poultry surface to reduced myoglobin, then subjecting the fresh meat and fresh poultry to a modified atmosphere including sufficient carbon monoxide by volume to convert a substantial portion of the reduced myoglobin to carboxymyoglobin to a depth of not more than about 0.375 inch, preferably not more than about 0.25 inch, below the surface of the fresh meat or fresh poultry. Until the conversion of the reduced myoglobin to carboxymyoglobin is complete, the modified atmosphere preferably includes as little oxygen as possible, and as little as possible of any other substance that would inhibit conversion to carboxymyoglobin. Preferably, the modified atmosphere will include at least about 10% by volume carbon dioxide and the balance substantially all molecular nitrogen and/or other inert gases. Some oxygen may be present during this conversion, but preferably in amounts not greater than about 10% by volume, and more preferably, in amounts not greater than about 5% by volume. Increasing the concentration of oxygen before the conversion is complete simply tends to inhibit the conversion to carboxymyoglobin as the oxygen competes for the reactive sites in the reduced myoglobin. A substantial portion is converted from reduced myoglobin to carboxymyoglobin when the naked eye can see a distinct overall color change from the purple color of reduced myoglobin to the bright red color of carboxymyoglobin.

The amount of carbon monoxide sufficient to effect such conversion to a depth not greater than about 0.375 inch, and preferably not greater than about 0.25 inch, varies depending upon the method employed to convert oxymyoglobin to reduced myoglobin. This method may be the use of a reducing agent, application of a vacuum, flushing with an inert gas such as nitrogen, or some other method. Thus, where a reducing agent such as ascorbic acid is used to form the atmosphere low in oxygen concentration, the carbon monoxide concentration may range from about 0.10% to about 3%. By contrast, where nitrogen flushing is used for this purpose, the carbon monoxide concentration may range from about 0.10% to about 1.5%, more preferably about 1%.

Similarly, the process of this invention comprises subjecting fresh fish to an atmosphere sufficiently low in oxygen concentration to change a substantial portion of the oxymyoglobin/oxyhemoglobin on and below the surface of the fresh fish to reduced myoglobin/hemoglobin, then subjecting the fresh fish to a modified atmosphere including sufficient carbon monoxide by volume to convert the reduced myoglobin/hemoglobin to carboxymyoglobin/carboxyhemoglobin on and below the surface of the fresh fish. Until the conversion of the reduced myoglobin/hemoglobin to carboxymyoglobin/carboxyhemoglobin is complete, the modified atmosphere preferably includes as little oxygen as possible, and as little as possible of any other substance that would inhibit conversion to carboxymyoglobin/carboxyhemoglobin. Preferably, the modified atmosphere will include at least about 10% by volume carbon dioxide and the balance substantially all molecular nitrogen and/or other inert gases. Some oxygen may be present during this conversion, but preferably not in amounts greater than about 10% by volume, and more preferably, in amounts not greater than about 5% by volume. Increasing the concentration of oxygen before the conversion is complete simply tends to inhibit the conversion to carboxymyoglobin/carboxyhemoglobin as the oxygen competes for the reactive sites in the reduced myoglobin/hemoglobin. A substantial portion is converted from reduced myoglobin/hemoglobin to carboxymyoglobin/carboxyhemoglobin when the naked eye can see a distinct overall color change from the purple color of reduced myoglobin/hemoglobin to the bright red color of carboxymyoglobin/carboxyhemoglobin. For fresh fish, sufficient carbon monoxide is generally in the range of about 0.10% to about 1.5%, more preferably from about 0.10% to about 1%, but these amounts may vary with the nature of the fish treated, the conditions to which the fish was exposed before being subjected to the process of this invention, and the method used to reduce oxymyoglobin/oxyhemoglobin to reduced myoglobin/hemoglobin.

The new process is particularly important and effective where the fresh meat, fresh poultry and fresh fish is maintained under refrigerated conditions, typically a temperature in the range of about 29° F. to about 40° F. In commercial practice, the ambient temperature may be somewhat lower (e.g., 26°–27° F.) without completely freezing the fresh meat, fresh poultry and fresh fish.

Subjecting fresh meat, fresh poultry and fresh fish to an atmosphere low in oxygen concentration converts the oxymyoglobin, which is red in color, on the fresh meat and fresh poultry, and the oxymyoglobin/oxyhemoglobin on the surface of fresh fish, which are also red in color, to the purple-colored reduced myoglobin and reduced myoglobin/hemoglobin, respectively. Subjecting the fresh meat, fresh poultry and fresh fish thereafter to the carbon monoxide-containing modified atmosphere converts the reduced myoglobin and reduced myoglobin/hemoglobin to carboxymyoglobin and carboxymyoglobin/carboxyhemoglobin, respectively, both of which are attractively red in color, and are stable under refrigerated conditions for long periods of time, such as two to four weeks.

During or following treatment in accordance with the new process, the fresh meat, fresh poultry and fresh fish may be maintained in a modified atmosphere including, by volume, about 10% to about 85% carbon dioxide, which inhibits growth of slime-and odor-producing organisms, and the balance substantially all nitrogen (molecular $N_2$) and oxygen (molecular $O_2$). The oxygen is preferably present in an amount as low as possible and preferably in the range of 0% to about 30%. This modified atmosphere may be applied, in whole or in part, during the conversion of reduced myoglobin, in meat and poultry, and reduced myoglobin/hemoglobin, in fish, to carboxymyoglobin and carboxymyoglobin/hemoglobin, respectively. Thus, in addition to carbon monoxide, that modified atmosphere may include at least about 10% carbon dioxide. However, the oxygen concentration should be as low as possible until conversion to the reduced myoglobin or reduced myoglobin/hemoglobin is complete. Again, the fresh meat, fresh poultry and fresh fish should be refrigerated, typically meaning maintenance in a temperature range of about 29° F. to about 40° F., preferably about 29° F. to about 33° F. Meat, poultry and fish maintained under these conditions will retain the good color produced by the new process for three to four weeks or even longer.

Alternatively, following treatment in accordance with the new process, the fresh meat, fresh poultry or fresh fish may be frozen and maintained in that state until ready for sale, consumption or other use. If frozen, the meat, poultry and fish will retain the red color of carboxymyoglobin and carboxyhemoglobin, and the carbon dioxide containing modified atmosphere need not be applied until the meat, poultry or fish is thawed. Meat, fish and poultry freeze at temperatures below about 29° F. at a pressure approximating atmospheric.

The process of this invention works on all kinds of fresh meat and fresh poultry, including beef, pork, veal, lamb, mutton, chicken, turkey and game such as venison, pheasant, quail, and duck. The meat may be processed or may be in the form of carcasses, primals (e.g., quarters), subprimals (e.g., top round), or retail cuts, and may be partially or wholly comminuted or mixed. The process is also effective on whole fish, fillets, and other forms that fish take, and on wide varieties of fish including salmon, sole, bass, trout, cod, and whitefish.

Producing an atmosphere of low oxygen concentration may be effected in any one of several ways, including placing the fresh meat, fresh poultry and fresh fish under an inert gaseous atmosphere containing a low concentration of oxygen. For example, an atmosphere high in nitrogen concentration, such as an atmosphere containing about 90% to about 100% nitrogen, by volume, for a period of time from about 15 minutes to about 2-3 hours, has proved effective for this purpose. Alternatively, the meat, poultry or fish may be subjected to vacuum treatment or may be treated with reducing agents such as ascorbic acid under conditions and for a time sufficient to convert oxymyoglobin and oxyhemoglobin to reduced myoglobin and reduced hemoglobin, respectively. In general, a low oxygen concentration means a concentration of less than about 10% by volume, more preferably, less than about 5% by volume, and as close to zero percent as practicable.

The modified atmosphere used in effecting conversion to carboxymyoglobin in meat and poultry and to carboxymyoglobin/carboxyhemoglobin in fish includes, by volume, sufficient carbon monoxide, broadly about 0.10% to about 3% for fresh meat and poultry, more preferably about 1% where the fresh meat is beef, to assure that the conversion of reduced myoglobin to carboxymyoglobin does not penetrate below the surface of the fresh meat to a depth of more than about 0.375 inch, preferably not more than about 0.25 inch. Preferably, about 0.10% to about 1.5% carbon monoxide is used for fresh fish to assure that the conversion of a substantial portion of the reduced myoglobin/hemoglobin to carboxymyoglobin/carboxyhemoglobin at the surface of the fresh fish is effected. Optimum amounts of carbon monoxide for different varieties of meat, poultry and fish vary depending upon the nature of the meat, poultry or fish, the method used to deoxygenate oxymyoglobin and oxyhemoglobin, and the conditions under which the meat or fish was maintained before being subjected to this new process.

The following examples illustrate that the new process establishes and maintains good color in many varieties of fresh meat, poultry and fish and maintains that good color over extended storage conditions if the fresh meat, poultry and fish are maintained under the modified atmosphere of this invention, or if the fresh meat, poultry and fish are frozen. In the examples, all gas percentages are by volume unless otherwise stated.

EXAMPLE I

One round beefsteak weighing about 0.5 pound was placed in a 10-liter desiccator and nitrogen was fed to the desiccator until the nitrogen concentration reached about 98%, and the oxygen level in the desiccator dropped to about 2%. The desiccator was left in this condition for about one hour until the color on the surface of the beef changed from the red of oxymyoglobin to the purple of reduced myoglobin. Carbon monoxide was fed to the desiccator until the concentration reached about 0.5% by volume, and was left on the meat for two days. After two days, the beef had absorbed nearly all of the carbon monoxide, the beefsteak surface had assumed the red color of carboxymyoglobin, and that color penetrated to a depth of about 0.125 to about 0.25 inch below the surface of the meat.

The desiccator was then filled with a modified atmosphere including about 55% carbon dioxide, about 16% oxygen, and the balance substantially all nitrogen. Six days later, the beefsteak retained its good red color, and the carboxymyoglobin color had penetrated no more deeply than it had at the end of two days.

A second round beefsteak weighing about 0.5 pound was dipped in a 1% ascorbic acid solution, and maintained in the acid for about ten minutes after which the meat color had changed from red (oxymyoglobin) to purple (reduced myoglobin). This steak was then placed in a 10-liter desiccator, and the desiccator was filled with an atmosphere comprising 1.0% oxygen, about 2.5% carbon monoxide and the balance substantially all nitrogen. After two days of storage, the steak had changed from purple to red (carboxymyoglobin), and the carboxymyoglobin had penetrated to a depth of about 0.25 inch below the surface of the meat.

Thereafter, an atmosphere consisting essentially of about 55% carbon dioxide, about 15% oxygen, and the balance substantially all nitrogen was fed to the desiccator, and the desiccator was so maintained for six days. After this period, the meat retained its good color, and the carboxymyoglobin had penetrated no more deeply into the meat than it had at the end of the two-day period.

EXAMPLE II

Each of five pieces of beef roundsteak weighing about 0.5 pound was placed in a separate 10-liter desiccator, and the desiccator was flushed with nitrogen to raise the nitrogen concentration to nearly 100%, and to reduce the oxygen level in the desiccator to near 0%. Each piece of beefsteak was maintained for one hour under this reduced oxygen atmosphere, after which each steak surface had changed from red to purple in color, indicating that the oxymyoglobin on the beef surface had changed to reduced myoglobin.

Each desiccator was then filled with carbon dioxide to a volume of about 70%, and carbon monoxide was added in amounts of 100, 200, 300, 400 and 500 cc to the five desiccators, respectively, to give a residual range of about 0.5% to about 3% carbon monoxide in the five different desiccators. (Although the amounts of carbon monoxide added appear to constitute about 1, 2, 3, 4 and 5% carbon monoxide, some carbon monoxide is apparently rapidly absorbed by the meat, reducing the measurable carbon monoxide content to the levels indicated.)

After storage under these conditions for seventeen days at 34° F., all beef attained and maintained the attractive red color of carboxymyoglobin, and none of the treated beef had spoiled. By contrast, steak held in air at 34° F. for the same period plainly had spoiled and had assumed the unattractive brown color of metmyoglobin. However, the formation of carboxymyoglobin had penetrated to depths greater than about 0.25 inch in all desiccators other than that to which 100 cc of carbon monoxide was added. These results indicate that the preferred concentration of carbon monoxide for attaining and maintaining good red beef color is preferably not more than about 1% and that carbon dioxide inhibits slime- and odor-producing organisms.

EXAMPLE III

Each of eight 100-gram chunks of beef was placed into a separate 10-liter desiccator and partial vacuum was pulled on each desiccator with an aspirator. Fifty and 100 cc of carbon monoxide were added to each of two desiccators immediately after vacuum was pulled. The same quantities were added to two other desiccators 15 minutes after vacuum was pulled, to two others 30 minutes after vacuum was pulled, and to the final two desiccators 60 minutes after vacuum was pulled.

Twenty-four hours later, high carbon dioxide concentrations, ranging from 70% to 85% by volume, were added to all the desiccators. The oxygen content of each desiccator rose to about 6-7% as the vacuum in each desiccator dissipated. The beef was held fifteen days at a temperature of 33°-34° F. under these conditions. Application of the vacuum to each desiccator turned the meat color from the bright red of oxymyoglobin to the reddish purple of reduced myoglobin, indicating that the oxygen had been removed from the oxymyoglobin at the beef's surface by the vacuum treatment.

All of the meat samples receiving a 50 cc treatment of carbon monoxide (0.5% carbon monoxide by volume) attained only fair color after 15 days of storage. The meat receiving 100 cc of carbon monoxide (1% carbon monoxide by volume) attained and retained good red carboxymyoglobin color at the end of the 15-day storage period. The time of application of carbon monoxide after vacuum treatment had no observable effect. This demonstrates that where vacuum is used to convert oxymyoglobin to reduced myoglobin before treatment with carbon monoxide, low concentrations of carbon monoxide may be used to produce carboxymyoglobin on and below the meat surface.

EXAMPLE IV

Each of 12 chunks of beef weighing about 100 grams was placed in a separate 10-liter desiccator. Each desiccator was flushed with nitrogen for five minutes to raise the nitrogen level to near 100% and to reduce the oxygen level to near zero. Thereafter, carbon dioxide was fed to each desiccator until the content reached about 65% by volume. Then, 10 cc, 25 cc, 50 cc and 100 cc, respectively, of carbon monoxide were added to four different desiccators, to produce carbon monoxide concentrations of 0.1%, 0.25%, 0.5% and 1%, respectively. Fifteen minutes later, four other desiccators were similarly treated and 60 minutes later, the last four desiccators received the same treatment.

All samples were thereafter held two weeks at 33°-34° F. After two weeks, all beef treated with 1% carbon monoxide had excellent color, regardless of the time period elapsed after flushing with nitrogen. Beef treated with 0.5% carbon monoxide one hour after flushing had comparable color after two weeks, but beef treated 15 minutes after flushing had only fair color, and beef treated immediately after flushing had poor color. Of the beef receiving 0.25% carbon monoxide treatments, beef treated one hour after flushing had fair color; beef treated 15 minutes and beef treated immediately after flushing had poor color. All beef samples receiving 0.1% treatment had poor color, regardless of the time elapsed after nitrogen flushing. In no case did the penetration of carboxymyoglobin into the meat exceed about 0.25 inch.

None of the beef was biologically spoiled, but air control samples maintained at the same temperature over the same storage period were all badly spoiled.

This example demonstrates that a 1% carbon monoxide concentration is effective to establish and maintain good red beef color for extended storage periods regardless of the time lapse between conversion of oxymyoglobin to reduced myoglobin through inert gas flushing and the subsequent conversion of reduced myoglobin to carboxymyoglobin. Carbon monoxide concentrations lower than 1% may be effective where sufficient time is allowed after inert gas flushing to effect conversion of oxymyoglobin to reduced myoglobin on the beef surface.

EXAMPLE V

Each of six beef ribsteaks was placed in a separate 10-liter desiccator, and each desiccator was then flushed with nitrogen to reduce the oxygen content to about zero percent. The steaks were left in this atmosphere for about one hour, after which the meat had turned from red to purple in color, indicating that oxymyoglobin on the beef surface had changed to reduced myoglobin. Carbon dioxide was then fed to each desiccator until the concentration in each had reached about 60% by volume. Then carbon monoxide was added at concentrations of 100 (1%), 75 (0.75%), 50 (0.5%), 25 (0.25%), 15 (0.15%) and 10 (0.1%) cc to the six different desiccators, and each was held in this condition at 34° F. for a period of nine days.

At the end of this period, all beefsteaks maintained under the atmosphere containing 1%, 0.75%, 0.5% and 0.25% carbon monoxide maintained the good red color of carboxymyoglobin. Beef held under the other atmospheres had good color, but was significantly less attractive. None of the treatments produced a penetration below the surface of the beef of greater than about 0.25 inch, and none of the meat was spoiled at the end of the storage period. These results indicate that the concentration of carbon monoxide may be as low as about 0.25% by volume where the conversion of oxymyoglobin to reduced myoglobin is complete before conversion to carboxymyoglobin is effected.

EXAMPLE VI

Separate, 100 gram chunks of beef, pork and lamb were placed into 12 different 10-liter desiccators. Nitrogen was fed to each desiccator until the nitrogen concentration in each rose to nearly 100%. Carbon dioxide was then fed to each desiccator until the concentration of carbon dioxide in each desiccator reached about 80%. Immediately thereafter, carbon monoxide was fed to three of the desiccators until the concentration therein reached about 1%, about 0.5% and about 0.25% respectively. Fifteen minutes later, the same concentrations of carbon monoxide were fed to three other desiccators. Thirty minutes later, the same three concentrations were fed to three more desiccators. Finally, one hour after the carbon dioxide content of each desiccator was raised to 80%, the carbon monoxide was fed to the last three desiccators, raising their carbon monoxide content to about 1%, about 0.5%, and about 0.25%, respectively. All desiccators were held under these conditions for 15 days at a temperature of about 33°–34° F.

Observation of the meat immediately after nitrogen flushing revealed that the red oxymyoglobin on the surface of the meat had been changed to the purple color of reduced myoglobin. In all cases where the carbon monoxide content was raised to about 1%, all of the meat changed from the purple myoglobin color to the red color of carboxymyoglobin within two days. However, in this test, where the concentration of carbon monoxide was 0.5% or 0.25%, good red carboxymyoglobin did not form on the surface of the beef, but did form on the surface of the lamb or pork. In all cases, none of the meat spoiled during the 15-day storage period, and none exhibited a carboxymyoglobin penetration below the surface of the meat greater than about 0.25 inch.

These results show that lower concentrations of carbon monoxide may be used to convert reduced myoglobin on the surface of pork and lamb than to effect the same conversion on the surface of an equal amount of beef.

EXAMPLE VII

Into each of three 10-liter desiccators were placed one pound samples of fresh, ground chuck beef hamburger. Each test sample of hamburger was bright red in color. Using a nitrogen flush, the oxygen content of each desiccator was reduced to about 2–3%. A similar procedure was applied to two one-pound samples of fillet of sole in two other desiccators.

One hour after the oxygen content of the five desiccators was reduced to about 2–3%, the color of the hamburger had changed from bright red to reddish-purple. The color of the fish had not noticeably changed.

After observing the color change in the hamburger, 100 cubic centimeters (1% by volume) of carbon monoxide was added to each of the five desiccators (3 containing hamburger samples, 2 containing fillet of sole samples). All the desiccators, and five control samples (3 hamburger samples, 1 pound each, and 2 fillet of sole samples, 1 pound each, neither subjected to nitrogen flush or carbon monoxide) were placed in a room at 35° F. and held for 16 to 18 hours. Thereafter, the samples were removed from the desiccators, and, together with control samples, were placed in a freezer at a temperature of about 0° to about 5° F. for ten days.

After the ten day storage period in the freezer, all samples were removed and allowed to thaw at ambient temperature for 6 hours. The carbon monoxide-treated hamburger had an attractive red color comparable to fresh hamburger. The treated fillet of sole had a pink color closely approximating the color of fresh fish. The two untreated control fillet of sole samples had a tannish-white appearance, and were considerably less attractive than the treated fish. The three untreated hamburger control samples were mostly brown in color and quite unattractive.

What is claimed is:

1. A process comprising subjecting fresh meat, fresh poultry or both to reduction for a time sufficient to change the red oxymyoglobin on and below the surface of said fresh meat, fresh poultry, or both, to visually-perceptible purple myoglobin, then subjecting said fresh meat, fresh poultry, or both, to a modified atmosphere including a concentration of carbon monoxide in the range of about 0.10% to about 3% by volume to convert said visually-perceptible purple myoglobin to visually-perceptible red carboxymyoglobin to a depth of not more than about 0.375 inch below the surface of said fresh meat, fresh poultry, or both.

2. The process of claim 1 wherein the temperature of the modified atmosphere is maintained at about 27° F. to about 40° F.

3. The process of claim 1 wherein the modified atmosphere includes at least about 10% carbon dioxide by volume, not more than about 10% oxygen by volume, and the balance is substantially all nitrogen.

4. The process of claim 3 wherein the modified atmosphere includes not more than about 5% oxygen by volume.

5. The process of claim 4 wherein said fresh meat is beef, and said modified atmosphere includes about 1% carbon monoxide.

6. The process of claim 4 wherein reduction is effected by subjecting said fresh meat, fresh poultry, or both, to a vacuum.

7. The process of claim 1 further comprising, during or after subjecting said fresh meat, fresh poultry, or both, to said modified atmosphere, maintaining said fresh meat, fresh poultry, or both, in a storage atmosphere including about 10% to about 85% carbon dioxide, and the balance substantially all nitrogen and oxygen.

8. The process of claim 7 wherein said storage atmosphere contains zero percent to about 30% oxygen.

9. The process of claim 1 wherein reduction is effected by subjecting said fresh meat, fresh poultry or both, to a vacuum.

10. The process of claim 1 wherein reduction is effected by applying a reducing agent to said fresh meat, fresh poultry, or both.

11. The process of claim 1 wherein said fresh meat, said fresh poultry, or both, are frozen after said myoglobin is converted to said carboxymyoglobin.

12. A process comprising subjecting fresh fish to reduction for a time sufficient to change the visually-perceptible red oxymyoglobin and visually-perceptible red oxyhemoglobin on and below the surface of said fresh fish to visually-perceptible purple myoglobin and visually-perceptible purple hemoglobin, and then subjecting said fresh fish to a modified atmosphere including a concentration of carbon monoxide in the range of about 0.25% to about 1.5% by volume to convert said visually-perceptible purple myoglobin and visually-perceptible purple hemoglobin to visually-perceptible red carboxymyoglobin and visually-perceptible red carboxyhemoglobin to a depth of not more than about 0.375 inch below the surface of said fresh fish.

13. The process of claim 12 wherein fresh fish is maintained at a temperature in the range of about 27° F. to about 40° F. during subjection of the fresh fish to the modified atmosphere.

14. The process of claim 12 wherein the modified atmosphere includes at least about 10% carbon dioxide by volume, not more than about 10% oxygen by volume and the balance is substantially all nitrogen.

15. The process of claim 14 wherein the modified atmosphere includes not more than about 5% oxygen by volume.

16. The process of claim 12 wherein said fresh fish is frozen after the conversion of said myoglobin and said hemoglobin to said carboxymyoglobin and said carboxyhemoglobin is complete.

17. The process of claim 12 further comprising, during or after subjecting said fresh fish to said modified atmosphere, maintaining said fresh fish in a storage atmosphere including about 10% to about 85% carbon dioxide and the balance substantially all nitrogen and oxygen.

18. The process of claim 17 wherein said storage atmosphere includes zero percent to about 30% oxygen.

19. A process comprising subjecting fresh meat, fresh poultry, or both, to reduction for a time sufficient to change the red oxymyoglobin at desired sites on and below the surface of said fresh meat, fresh poultry, or both, to visually-perceptible purple myoglobin, then subjecting said fresh meat, fresh poultry, or both, to a modified atmosphere including a concentration of carbon monoxide in the range of about 0.10% percent to about 3% by volume to convert said visually-perceptible purple myoglobin to visually-perceptible red carboxymyoglobin to a depth of not more than about 0.375 inch below the surface of said fresh meat, fresh poultry, or both, at said sites.

20. The process of claim 19 wherein said modified atmosphere includes, in addition to said carbon monoxide, at least about 10% carbon dioxide by volume, and not more than about 10% oxygen by volume, and the balance is substantially all nitrogen.

21. The process of claim 20 wherein the process is carried out on fresh meat.

22. The process of claim 20 wherein the process is carried out on fresh poultry.

23. The process of claim 19 wherein the process is carried out on fresh meat.

24. The process of claim 19 wherein the process is carried out on fresh poultry.

25. A process comprising subjecting fresh fish to reduction for a time sufficient to change the visually-perceptible red oxymyoglobin and visually-perceptible red oxyhemoglobin at desired sites on and below the surface of said fresh fish to visually-perceptible purple myoglobin and visually-perceptible purple hemoglobin, and then subjecting said fresh fish to a modified atmosphere including a concentration of carbon monoxide in the range of about 0.25% to about 1.5% by volume to convert said visually-perceptible purple myoglobin and visually-perceptible purple hemoglobin to visually-perceptible red carboxymyoglobin and visually-perceptible red carboxyhemoglobin to a depth of not more than about 0.375 inch below the surface of said fresh fish, at said sites.

26. The process of claim 25 wherein the modified atmosphere includes, in addition to carbon monoxide, at least about 10% carbon dioxide by volume, and not more than about 10% oxygen by volume, and the balance is substantially all nitrogen.

* * * * *